United States Patent
Fox et al.

(10) Patent No.: US 10,473,464 B2
(45) Date of Patent: Nov. 12, 2019

(54) CUBOID INERTIAL MEASUREMENT UNIT

(71) Applicant: Cubic Corporation, San Diego, CA (US)

(72) Inventors: Andrew John Fox, Chippenham (GB); Matthew Parry, Chippenham (GB); Byron Bradley, Bristol (GB)

(73) Assignee: Cubic Corporation, San Diego, CA (US)

( * ) Notice: Subject to any disclaimer, the term of this patent is extended or adjusted under 35 U.S.C. 154(b) by 0 days.

(21) Appl. No.: 16/250,796

(22) Filed: Jan. 17, 2019

(65) Prior Publication Data

US 2019/0219395 A1 Jul. 18, 2019

Related U.S. Application Data

(60) Provisional application No. 62/618,507, filed on Jan. 17, 2018.

(51) Int. Cl.
| | |
|---|---|
| *G01C 19/5776* | (2012.01) |
| *G01C 19/5783* | (2012.01) |
| *G01C 21/16* | (2006.01) |

(52) U.S. Cl.
CPC ..... *G01C 19/5776* (2013.01); *G01C 19/5783* (2013.01); *G01C 21/16* (2013.01)

(58) Field of Classification Search
CPC .............. G01C 19/5776; G01C 19/574; G01C 19/5712; G01C 21/16; G01C 21/18; G01P 15/18; G01P 15/08; G01P 15/14
See application file for complete search history.

(56) References Cited

U.S. PATENT DOCUMENTS

| | | | | |
|---|---|---|---|---|
| 3,269,179 A | * | 8/1966 | Anderson | G01C 21/16 33/321 |
| 4,020,702 A | * | 5/1977 | Epstein | G01C 21/16 74/5.34 |
| 4,601,206 A | * | 7/1986 | Watson | G01C 21/16 73/510 |
| 4,711,125 A | * | 12/1987 | Morrison | G01P 15/18 73/178 R |

(Continued)

FOREIGN PATENT DOCUMENTS

| | | |
|---|---|---|
| DE | 19610554 A1 | 10/1996 |
| DE | 10 2016/122042 A1 | 5/2017 |

*Primary Examiner* — Helen C Kwok
(74) *Attorney, Agent, or Firm* — Kilpatrick Townsend & Stockton LLP

(57) ABSTRACT

An inertial measurement unit includes a substrate having MEMS gyroscopes arranged on the substrate as opposing pairs. The gyroscopes of each opposing pair are arranged on opposite sides of an axis of rotation of the substrate and each opposing pair has a central axis that intersects an axis of rotation of the substrate. A processor receives a rotational measurement from each gyroscope, compares the measurements from gyroscopes of each opposing pair, determines a mean or median rotation value for each opposing pair, and compares the mean or median rotation value with a threshold value. The processor assigns a weight to the mean or median value for each opposing pair and determines a rotation of the cuboid inertial measurement unit based on the mean or median value for each opposing pair and the respective weight for the mean or median value for each opposing pair.

19 Claims, 8 Drawing Sheets

(56) References Cited

U.S. PATENT DOCUMENTS

| | | | | |
|---|---|---|---|---|
| 4,825,716 A | * | 5/1989 | Roberts | B64G 1/286 74/5.34 |
| 5,363,700 A | * | 11/1994 | Joly | G01C 21/16 73/431 |
| 7,759,685 B2 | * | 7/2010 | Rather | B81B 7/02 257/416 |
| 8,812,233 B2 | * | 8/2014 | Kontz | G01C 19/5776 701/502 |
| 8,813,565 B2 | * | 8/2014 | Caminada | G01C 19/56 73/504.12 |
| 8,850,886 B2 | * | 10/2014 | Kempe | G01C 19/574 73/504.04 |
| 9,213,046 B2 | * | 12/2015 | Wang | G01C 21/16 |
| 9,354,058 B2 | * | 5/2016 | Yost | G01C 19/5776 |
| 9,523,702 B2 | * | 12/2016 | Kinoshita | G01P 1/00 |
| 2008/0302183 A1 | * | 12/2008 | Peng | G09G 3/3466 73/504.12 |
| 2009/0013783 A1 | | 1/2009 | Andersson | |
| 2010/0058860 A1 | * | 3/2010 | Rutkiewicz | G01C 21/16 73/493 |
| 2011/0209544 A1 | * | 9/2011 | Tzidon | G01C 21/16 73/514.01 |
| 2013/0311129 A1 | | 11/2013 | Yost | |

\* cited by examiner

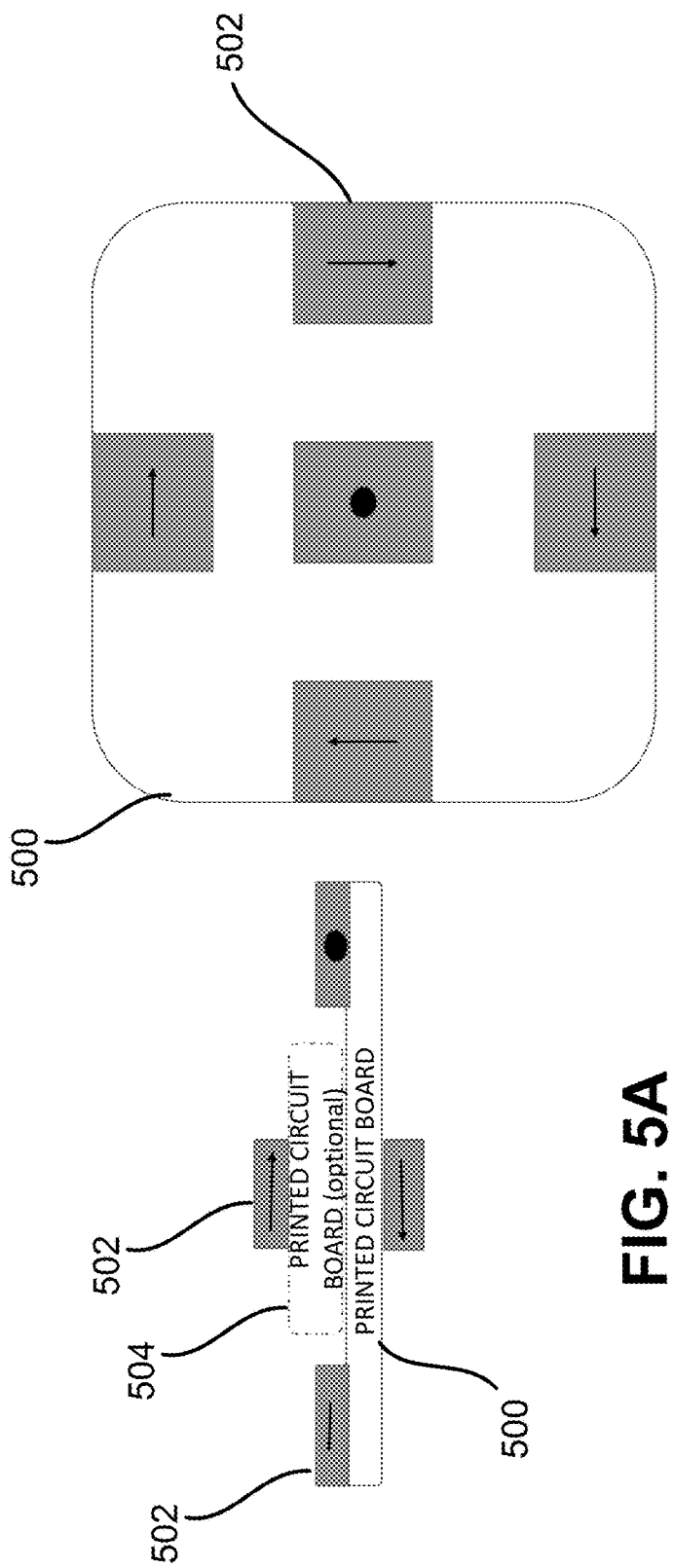

CUBOID INERTIAL MEASUREMENT UNIT

CROSS-REFERENCES TO RELATED APPLICATIONS

This Application claims priority to U.S. Provisional Patent Application No. 62/618,507, filed Jan. 17, 2018, entitled "CUBOID INERTIAL MEASUREMENT UNIT," the entire disclosure of which is hereby incorporated by reference, for all purposes, as if fully set forth herein.

BACKGROUND OF THE INVENTION

In applications where large, heavy, and/or expensive inertial measurement units (IMUs) are not practical, such as in mobile telephones, portable navigation devices, other handheld devices, and the like, magnetometers combined with gyroscopes and accelerometers are often used. These are typically microelectromechanical systems (MEMS) based, low cost, very compact and consume little power. However, limitations of MEMS technology, especially the typical devices found in mobile devices, include stability and noise issues. Bearing is typically determined using magnetometers in combination with Global Navigation Satellite Systems (GNSS) receivers, so magnetic distortions can cause false readings while the loss of signal from GNSS when travelling in tunnels or buildings can results in a loss of position and orientation. For applications such as dead reckoning and for navigation in GNSS denied environments, the gyroscope is an ideal solution since it does not suffer from magnetic distortions or anomalies. However, MEMS gyroscopes are very noisy and suffer from environmentally induced errors.

Typical approaches to extracting rotational information, such as the Earth's rotation, from a MEMS gyroscope include linear-long term analysis (i.e. the unit must be kept static for many minutes or hours in order to perform the measurement). Many of these techniques use recursive filtering techniques such as a Kalman filter, while more recent approaches include artificial analysis approaches such as Markov Decision Process and Particle Filtering. While the aforementioned approaches typically rely on the system remaining linear, there are approaches to allow these approaches to give good results in a non-linear environment. One such approach is the Extended Kalman Filter. The effectiveness of these approaches can be improved by reducing the noise on the sensors before applying a filter or subsequent noise reduction technique. Employing more than one sensor, such as a MEMS gyroscope and averaging the readings from each sensor for a given sample period will reduce the noise.

The current state of the art is to employ either very expensive and bulky laser ring gyroscopes or low costs MEMS sensors and apply long term averaging and/or using Kalman filters (including extended Kalman filters) and particle filters. The issue with the latter approach is that it only really works when the filter is stationary and does not function well in a dynamic environment. This is due to the long term averaging needed in order to, for example, detect and measure the Earth's rotation.

The most commonly used approach to reduce the noise on the gyroscope is a complimentary filter which combines the output of the gyroscope with an accelerometer. These two sensors work to filter each other. However, this technique will not facilitate the measurement of the Earth's rotation with currently available MEMS sensors.

BRIEF SUMMARY OF THE INVENTION

Embodiments of the present invention are directed to inertial measurement units (IMUs) that are configured to quickly and accurately measure rotation of a body, even in nonlinear or non-stationary applications. Embodiments utilize MEMS gyroscopes arranged on a substrate to measure such rotation, which provide cost-effective, low-power, and lightweight solutions. Embodiments of the present invention achieve such quick and accurate rotation measurements in two ways. First, the particular arrangement of the MEMS gyroscopes about the substrate is designed to provide rotation results that are easily interpretable, even in the presence of noise within the sensor data. Additionally, the IMUs described herein utilize novel filtering and correction techniques to quickly determine whether a particular set of sensor data is reliable and to account for a degree of reliability of the data. This allows the IMUs described here to generate accurate results over a short number of sensor data cycles, eliminating the need to rely primarily on long-term averaging of sensor data.

In one embodiment, an inertial measurement unit is provided. The unit may include a substrate and a plurality of MEMS gyroscopes arranged on the substrate as opposing pairs. The MEMS gyroscopes of each of the opposing pairs of MEMS gyroscopes may be arranged on opposite sides of an axis of rotation of the substrate. Each of the opposing pairs may have a central axis that intersects at least one axis of rotation of the substrate. The unit may also include a processor that is configured to receive a rotational measurement from each of the plurality of MEMS gyroscopes, compare the measurements from the MEMS gyroscopes of each of the opposing pairs with one another, and determine at least one of a mean or a median rotation value for the measurements of each of the opposing pairs of MEMS gyroscopes. The processor may be further configured to compare the at least one of the mean or the median rotation value with a threshold value, assign a weight to the at least one of the mean or the median value for each of the opposing pairs of MEMS gyroscopes, and determine a rotation of the cuboid inertial measurement unit based on the at least one of the mean or the median value for each of the opposing pairs of MEMS gyroscopes and the respective weight for each of the at least one of the mean or the median value for each of the opposing pairs of MEMS gyroscopes.

In another embodiment, a method of determining a rotation is provided. The method may include receiving a rotational measurement from each of a plurality of MEMS gyroscopes positioned on a substrate of a cuboid inertial measurement unit. The plurality of MEMS gyroscopes may be arranged on the substrate as opposing pairs and each of the opposing pairs may have a central axis that intersects at least one axis of rotation of the substrate. The method may also include comparing the measurements from the MEMS gyroscopes of each of the opposing pairs with one another, determining at least one of a mean or a median rotation value for the measurements of each of the opposing pairs of MEMS gyroscopes, and comparing the at least one of the mean or the median rotation value with a threshold value. The method may further include assigning a weight to the at least one of the mean or the median value for each of the opposing pairs of MEMS gyroscopes and determining a rotation of the cuboid inertial measurement unit based on the at least one of the mean or the median value for each of the opposing pairs of MEMS gyroscopes and the respective weight for each of the at least one of the mean or the median value for each of the opposing pairs of MEMS gyroscopes.

In another embodiment, an inertial measurement unit may include a substrate and a plurality of MEMS gyroscopes arranged on the substrate as opposing pairs. The MEMS gyroscopes of each of the opposing pairs of MEMS gyroscopes may be arranged on opposite sides of an axis of rotation of the substrate. Each of the opposing pairs may have a central axis that intersects at least one axis of rotation of the substrate. The plurality of MEMS gyroscopes may be configured to measure a rotation of the substrate. The unit may also include at least one electrical circuit in communication with the plurality of MEMS gyroscopes and a connector that is in communication with the at least one electrical circuit and that is configured to couple with a processor so as to electronically couple the plurality of MEMS gyroscopes with the processor.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 5A is a front view of a cuboid inertial measurement unit according to embodiments.

FIG. 5B is a top view of the cuboid inertial measurement unit of FIG. 5A.

DETAILED DESCRIPTION OF THE INVENTION

Figure 1:
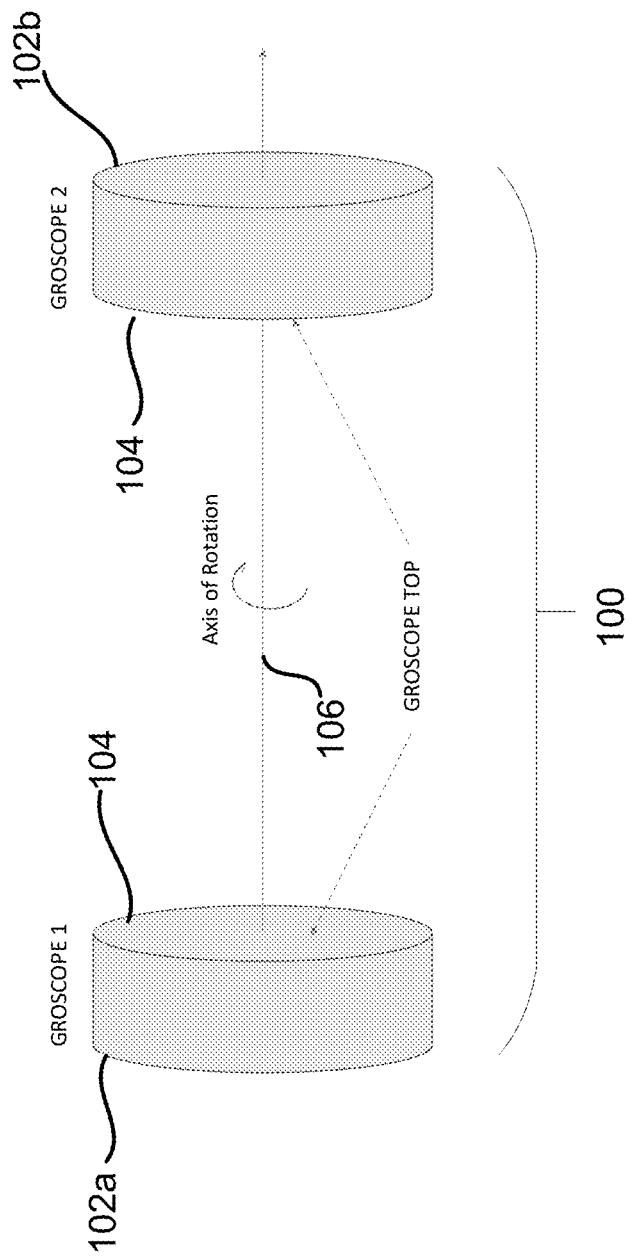
FIG. 1 schematically illustrates an opposing pair of sensors in accordance with the present invention.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments of the present invention are generally related to low-cost compact devices capable of providing navigation bearing information in the presences of magnetic anomalies such as iron or magnets. Applications may exist for mobile devices (cell phones, personal media players, etc.). It will be appreciated that a person of skill in the art will understand that alternative embodiments may vary from the embodiments discussed herein, and applications may vary as well. For example, it will be appreciated that embodiments of the present invention may have applications in any navigation or orientation device. For example, applications may include cellular phone (or other personal devices) and automotive applications where the bearing system described herein are combined with 3D dead reckoning algorithms to provide navigation information. Other applications may include detecting the orientation of a device, including weapons (Bluetooth® firing attachment, Light Gun, Mortar, etc.) or locating a war fighter training application in a GNSS denied environment. Embodiments may also provide a significant development for geopairing.

Embodiments of the present invention utilize low cost and compact MEMS sensors to measure orientation with a very high degree of accuracy. These measurement units may be embodied in a unit referred to herein as a cuboid inertial measurement unit (CIMU) and/or inertial measurement unit (IMU).

In contrast to typical approaches to extracting rotational information from a MEMS gyroscope using linear, long term analysis with the unit being kept static for many minutes or hours in order to perform the measurement, embodiments of the present invention. Rather, embodiments of the present invention may operate using a weighted average of opposing pairs of MEMS sensors that are arranged such that the MEMS sensors within an opposing pair generate opposite and equal (or approximately equal) outputs. Such arrangements help ensure that any external perturbation (physical, vibration, mechanical) are canceled out and/or minimized. For example, if a perturbation originates from the left of an inventive IMU where one gyroscope of an opposing pair is oriented clockwise and the other is counterclockwise, outputs from the two gyroscopes cancel out one another to remove and/or minimize perturbations (works for high vibration/shock environments).

For example, the outputs of equal and opposite gyroscopes of an opposing pair may be added to get 0. If noise is present on a gyroscope such that non-zero answer is given, then a confidence level may be applied based on the reliability of the non-zero answer. If the answer is always 0, the outputs of each gyroscope of an opposing pair may be separately used and assigned a high confidence as the values are likely very accurate. As just one example, if an inventive IMU includes 5 opposing pairs, each pair may give different non-zero answer (1, 2, 0.1, etc.). The values of the opposing pairs may be weighted based on a reliability of each value and a weighted average of the outputs may be calculated to determine a rotation of a body.

In some embodiments, the IMUs described herein may include filters, such as Kalman filters, which may include variables that may be tuned to reduce noise while still detecting rapid movements. The filter(s) may be adjusted to change the wave/gain to selectively (in real-time or near real-time) adjust error before generating calculation of weighted average. Each opposing pair of sensors may experience its own noise level, so the filter adjustments may be applied to each pair and/or to multiple/all pairs of sensors. Such filtering and/or any necessary processing may be done in one instantaneous sample period, allowing the noise to be adjusted immediately. This allows the filter to be quite reactive, as noise at a given time is known. Based on detected noise, the filter may be tuned (using a feedback loop) and the filter may be applied immediately to correct the sensor outputs, creating a fluid process for accurately detecting rotation of a body that experiences significantly less lag than conventional IMUs, which often rely on long-term averaging to converge at an actual rotation value.

Among other things, novel aspects of the embodiments described herein include the physical arrangement of MEMS sensors that enable a confidence interval for the accuracy of the measurement. This confidence level may be used as a weight for that particular sample and/or in probability analysis that generates a statistical likelihood of error for that sample. An algorithm is applied to an output of the sensors to that utilizes the confidence levels. This provides a very significant noise reduction and correspondingly more accurate measurements of rotation as compared to conventional techniques.

Embodiments of the present invention provide numerous benefits over traditional IMUs. For example, embodiments, of the invention significantly reduce sensor noise, which in turn significantly improves measurement accuracy and enables the detection of very small rotations. Embodiments also may facilitate accurate dead reckoning. For example, the CIMUs described herein may be integrated with a GNSS receiver that includes a 3-dimensional (3D) dead reckoning capability. Embodiments of the present invention do not rely on long term averaging of samples and thus, may be usable in dynamic applications where it may not be possible to keep the CIMU stationary for a period of minutes, hours, or other extended period of time. Embodiments of the invention are also compact and lightweight and may also provide low cost bearing solutions that need little power to operate.

Embodiments of the present invention provide techniques that reduce sensor noise reduction that can be applied to linear and nonlinear systems and achieve a significant noise reduction during the sampling period. For example, the invention may involve an arrangement of the sensors such that in a noise free environment the output from the combined sensors is always zero. In order to achieve this, each sensor must be physically aligned such that their output readings are equal and opposite in sign. For example, two MEMS gyroscopes 102 may be arranged as an opposing gyroscopic pair 100 with the gyroscopes 102 being physically located opposite each other about an axis of rotation 106 and with the top 104 of each gyroscope 102 facing each other as illustrated in FIG. 1. In some embodiments, rather than having the tops 104 face one another, the tops 104 may face opposite directions such that bottoms of the gyroscopes 102 face one another. Moreover, it will be appreciated that in some embodiments, opposing gyroscopic pairs 100 may be spaced side by side, but with their rotational directions opposing one another. For example, a left gyroscope 102 may have a counterclockwise rotational orientation while a right gyroscope 102 may have a clockwise rotational orientation.

If the output from each of the gyroscopes is summed, the output of all rotation is always zero (assuming no noise). If random noise is included on each of the gyroscopes, the output will be one of the following 3 events: 1) the OGP output is zero and the noise on that particular sample is zero, 2) the OGP output is zero and the noise on that particular sample is equal and opposite on each sensor, or 3) the OGP output is non zero due to random, non-correlated events on the OGPs. If the output is event 1), it can be determined that the gyroscope reading is accurate and a high weight confidence may be applied to the output of that particular OGP. If the output is event 2), it can be known that that the output from each gyroscope within the OGP is giving the same answer. If the output is event 3), it can be determined with some level of confidence from that particular OGP that is proportional to value above or below zero (since this is a measure of the noise).

The actual rotation rate may be determined (typically in degrees per second for a digital MEMS gyroscope) by inverting the sign of one of the gyroscope outputs so that the outputs sum, rather than add. In some embodiments, this determination may be done using an average and/or median value of the two gyroscope outputs to get the rotation rate. For convenience, this is referred to herein as sign inverted opposing gyroscopic pair (SiOGP).

If event 1) occurs and the output of a particular SiOGP is the same as the mean of all the SiOGPs, a high confidence level may be associated with the SiOGP output and a heavy weight may be applied. If event 2) occurs and the output of a particular SiOGP is not the same as the mean of all SiOGPs, a lower confidence level is associated with the output of the SiOGP and a lower weight is applied. If event 3) occurs and the output of a particular SiOGP is not the same as the mean of all the SiOGPs, a lower confidence level is associated with the output of the SiOGP and a lower weight is applied.

In some embodiments, a particular result from an OGP may be rejected or filtered out if the output is above or below a particular threshold relative to some average or statistical combination of all of the OGPs.

In mobile devices, battery and processing power may be at a premium, so a weighted average is a very convenient solution that yields good results without unnecessarily high power and/or processing demands.

Figure 2:
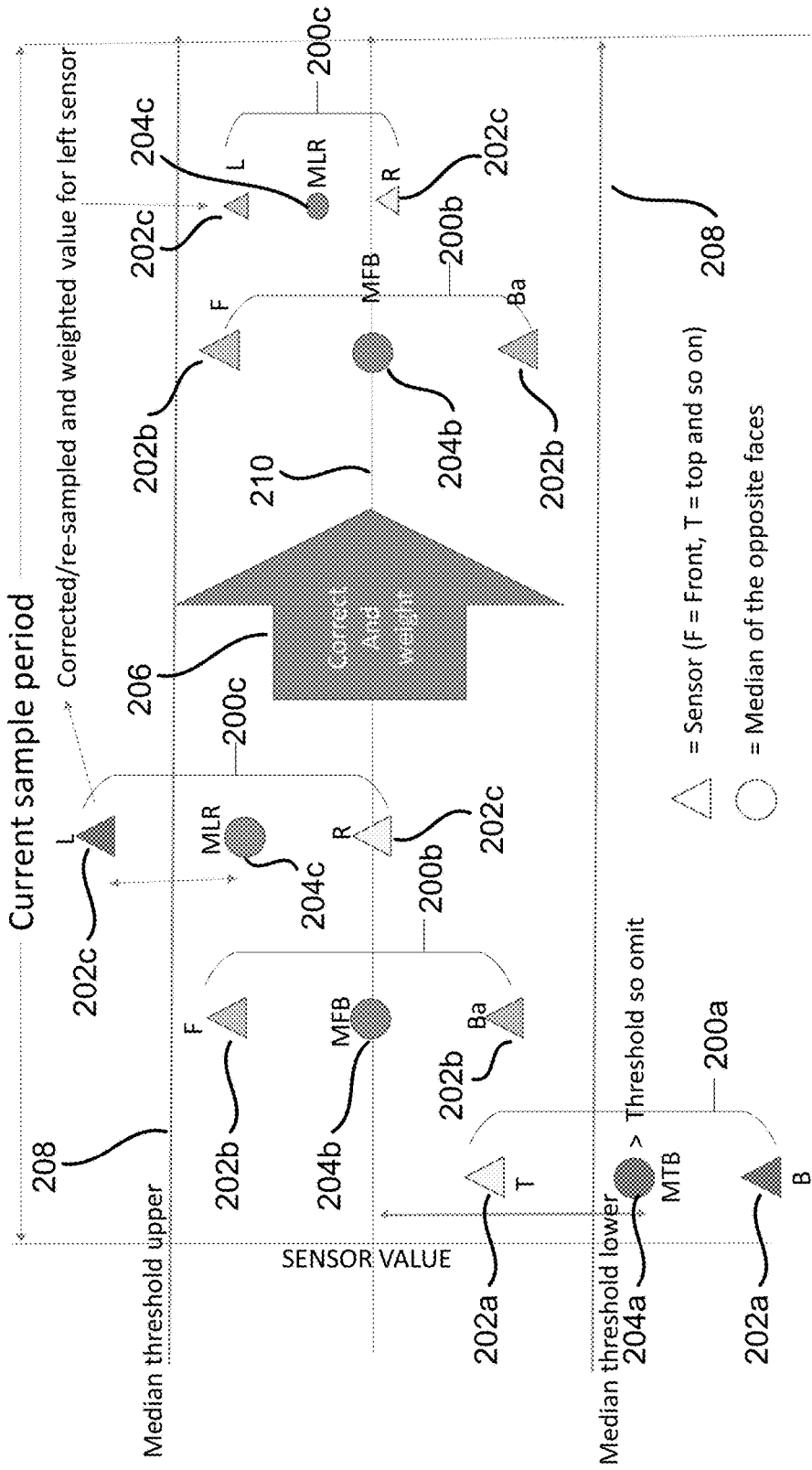
FIG. 2 illustrates a process for generating a rotational value according to embodiments.

FIG. 2 illustrates a graphical representation of filtering events that may be used to determine rotation using OGPs, such as using a number of OGPs 100 described above in relation to FIG. 1. It is important to note that all of the operations can be performed in one sample period, which makes the techniques described herein ideal for nonlinear systems. The triangular symbols each represent an output from a MEMS gyroscope 202 from an opposing pair 200 of MEMS gyroscopes 202. For example, as illustrated, there are three opposing pairs 200. A first opposing pair 200a includes a top MEMS gyroscope 202a and a bottom MEMS gyroscope 202a. The top MEMS gyroscope 202a and the bottom MEMS gyroscope 202a are positioned on a substrate of an IMU such that the top MEMS gyroscope 202a and the bottom MEMS gyroscope 202a have equal and opposite orientations relative to one another, such as described in relation to FIG. 1. A mean or median output 204a is generated based on the outputs of the top MEMS gyroscope 202 and the bottom MEMS gyroscope 202. Similarly, a second opposing pair 200b includes a front MEMS gyroscope 202b and a back MEMS gyroscope 202b. The front MEMS gyroscope 202b and the back MEMS gyroscope 202b are positioned on the substrate of the IMU such that the front MEMS gyroscope 202b and the back MEMS gyroscope 202b have equal and opposite orientations relative to one another. A third opposing pair 200c includes a left MEMS gyroscope 202c and a right MEMS gyroscope 202c. The left MEMS gyroscope 202c and the right MEMS gyroscope 202c are positioned on the substrate of the IMU such that the left MEMS gyroscope 202c and the right MEMS gyroscope 202c have equal and opposite orientations relative to one another. Thus, in the illustrated scenario, a CIMU is utilized and in some embodiments may have a gyroscopic layout similar to that illustrated in any of FIGS. 4A-5B. As illustrated in FIG. 2, the letters B, T, F, Ba, L, and R refer to the sensor position: Bottom, Top, Front, Back. Left, and Right, respectively.

During each sample period (which may be less than a second in some embodiments), each MEMS gyroscope 202 outputs a rotational measurement. These outputs may be positive and/or negative measurements (which may depend on the orientation of an individual MEMS gyroscope 202. Once each MEMS gyroscope 202 outputs a rotational measurement in a given sample period the mean and/or median values 204 are generated for each opposing pair 200. These mean and/or median values 204 may be compared to one or more threshold levels 208. As just one example, an upper threshold 208 and a lower threshold 208 may be used, although in other embodiments only an upper or a lower threshold may be used. In yet other embodiments, additional intermediate thresholds may be utilized such that values in more inner thresholds are more reliable than values at outer thresholds, with the outer thresholds still producing acceptable values. It will be appreciated that the location and number of the thresholds may be unique to a particular application. The threshold level(s) 208 may be predetermined amounts based on an acceptable amount of deviation (such as by using standard deviations) from an expected value 210. In other embodiments, the placement of threshold level(s) 208 may be driven by the gyroscope outputs. As just one example, the threshold level(s) 208 may be generated using control chart theory, and in some embodiments, the threshold level(s) 208 may evolve over time based on changes and/or trends in the gyroscope outputs.

In some embodiments, when a median and/or mean value 204 is at (or very close to) an expected value 210 (such as median and/or mean value 204b), the median and/or mean value 204 is deemed to be accurate may remain unchanged. When a median and/or mean value 204 is somewhere between the expected value 210 (which may be based on previous sample periods and/or may be predetermined) and the threshold 208 (such as median and/or mean value 204c) the median and/or mean value 204 is accepted, but may be corrected and/or weighted. If the median and/or mean value 204 is outside the allowable threshold 208 and may be discounted or corrected (and will likely have a low weight assigned).

After the comparison of the median and/or mean values 204 to the threshold(s) 208 some or all of the values 204 may be corrected and/or assigned a weight that corresponds to a confidence level of the particular value 204. Such processing is represented to the right of arrow 206. For example, as can be seen that sample value 204a (and the outputs of MEMS gyroscopes 202a) has been removed entirely, as the sample was deemed to be inaccurate based on the value 204a being outside of the thresholds 208. Value 204c (and the outputs of MEMS gyroscopes 202c) has been corrected and a weight is assigned to the corrected value 204c (and possibly the corrected outputs of MEMS gyroscopes 202c), with the weight being represented by the size of the shapes. As value 204b for opposing pair 200b was deemed accurate, the value 204b remains unchanged and a higher weight (larger shape size) is assigned to the values for opposing pair 200b. Once this process is complete (for any number of opposing pairs on a given IMU), a weighted average of the corrected samples can be calculated.

Once the samples have been assessed and weighted/corrected (where applicable), the process above may be repeated (within the same sample period time) but with a new statistical combination of all the corrected/weighted SiOGP values until a target convergence is achieved (which might be satisfied once the iterated value of the corrected/weighted SiOGP changes by less than a target amount).

The weights assigned to each of the values of the MEMS gyroscopes 202 and/or opposing pairs 200 may be assigned based on the event type detected (as described in relation to FIG. 1) and/or based on how far the respective values are from an expected/target value and/or the threshold(s). In embodiments with intermediate thresholds, each threshold may include its own weight and/or range of weights that values falling within the threshold may be assigned. The weights reflect a confidence level of the particular measurement. As just one example, a measurement that is viewed as being highly accurate may have a weight assigned that is between about 0.9 and 1, while a less accurate, but still acceptable measurement may be assigned a weight of between about 0.7 and 0.9. It will be appreciated that the weights and/or ranges of weights may be application specific and any combination of weights may be used based on the needs of a particular application. Additionally, a similar procedure may be performed with an IMU having any number of opposing pairs of MEMS gyroscopes.

Figure 3:
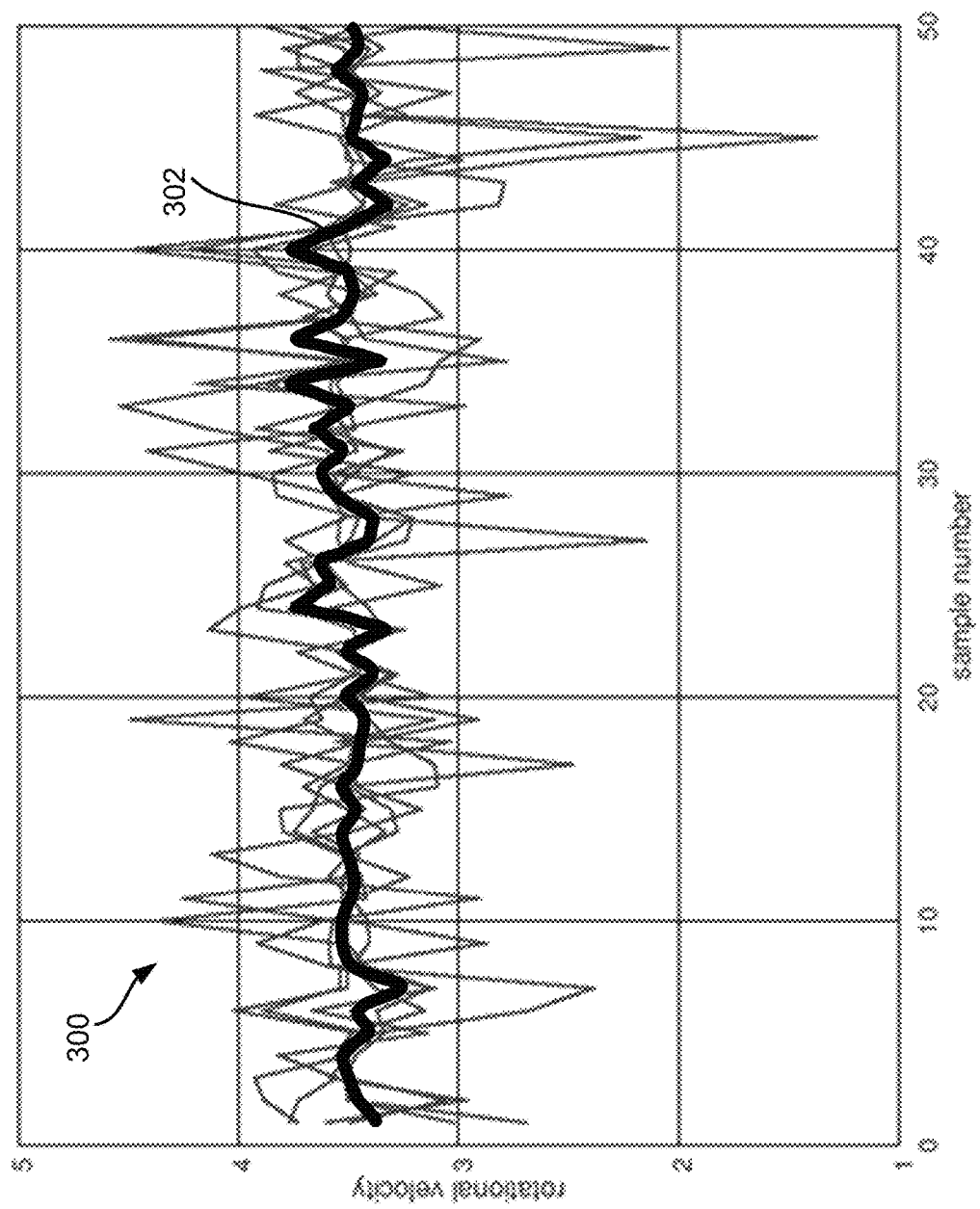
FIG. 3 is a graph illustrating an output from a process for generating a rotational value according to embodiments.

FIG. 3 illustrates a graph that demonstrates noise reduction achieved using a CIMU in accordance with the present invention, similar to that noise reduction achieved in FIG. 2. In the illustrated embodiment, the actual rotation is 3.5 degrees per second. The individual sensor values 300 extend around the actual rotation value, while the weighted average 302 (bold line) very closely follows the actual rotation of 3.5 degrees per second, thus demonstrating the effectiveness of the inventive techniques. Unlike conventional IMUS using MEMS gyroscopes, rather than providing outputs based on long-term averaging, the present invention arrives at the weighted average 302 using instantaneous corrections. It will be noted each sample point represents a particular sampling/correction period, and that the weighted average of the mean and/or median values of the opposing pairs closely tracks the actual value, even at discrete points along the trend line. Notably, around sample number 45 one of the sample measurements has an extremely large spike of noise. Even still, the present techniques generate a weighted average (of instantaneous sensor mean and/or median values) where the weighted average 302 stays very consistent even in the presence of a large spike of noise.

If the rotation of FIG. 3 was measured using a single MEMS gyroscope, the measured rotation would be very inaccurate. However, when measured in accordance with the techniques described herein an expected value (the SiOGP combined output (after corrections/weighting)) is generated in a very short time (a matter of seconds) that approximates the actual rotation. In fact, many of the samples are very close to the actual rotation. In some embodiments, accelerometers may be used to detect periods of no motion and/or linear or nonlinear filter techniques could be implemented to arrive at the expected value much faster than if relying on only a single MEMS gyroscope.

It should be noted that there are many statistical ways in which samples may be corrected. For example, a particle filter may be applied in both time and sensor depth (this being the number of OGPs available during each sample period). Some embodiments may utilize Kalman filters and variants thereof.

Figure 4B:
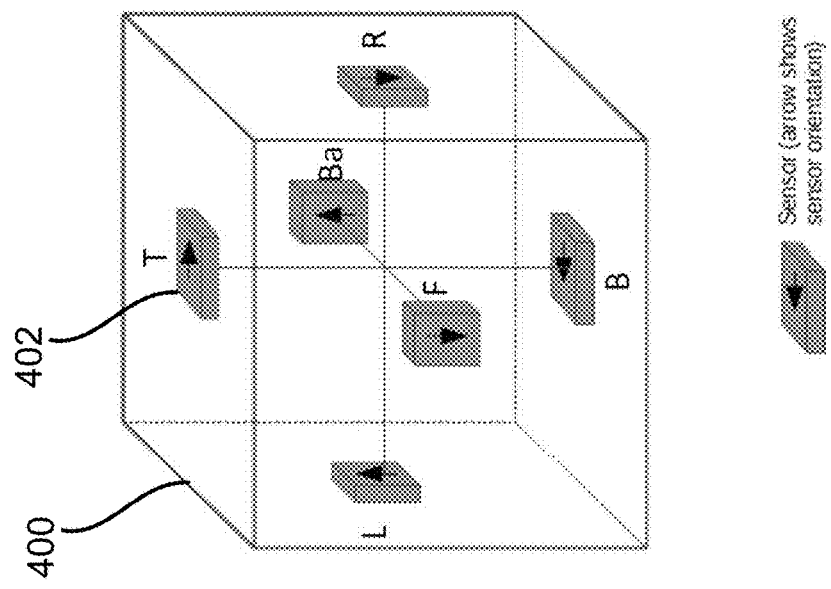
FIG. 4B illustrates a cuboid inertial measurement unit according to embodiments.
Figure 4A:
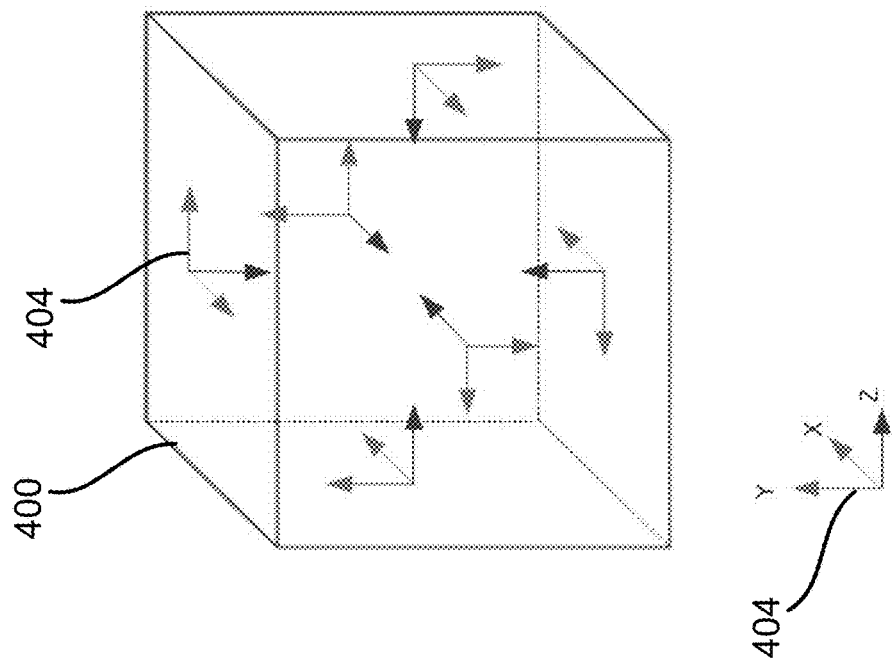
FIG. 4A illustrates a cuboid inertial measurement unit according to embodiments.
Figures 6A, 6B:
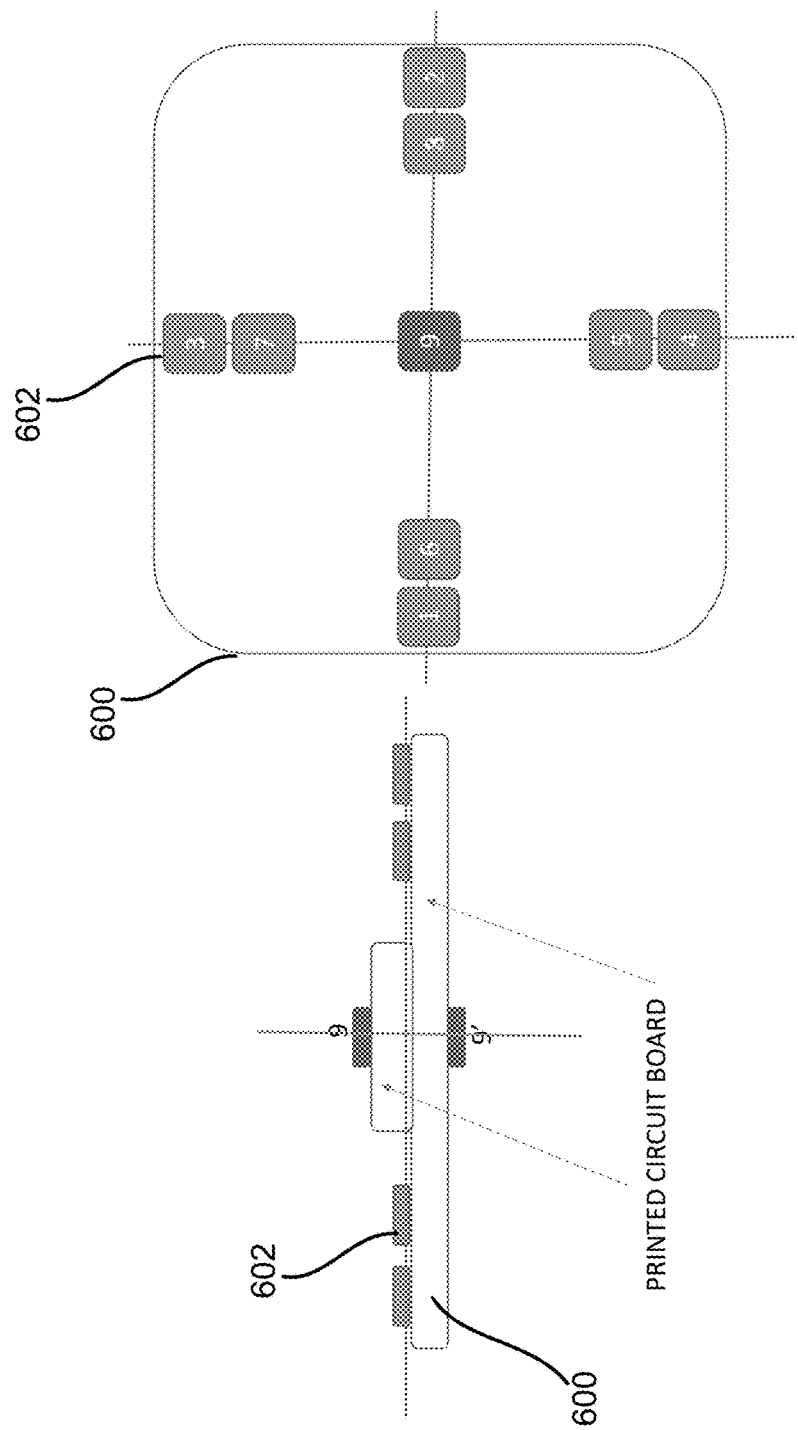
FIG. 6A is a front view of a cuboid inertial measurement unit according to embodiments.
FIG. 6B is a top view of the cuboid inertial measurement unit of FIG. 5A.

FIGS. 4A and 4B illustrate one particular arrangement of multiple opposing gyroscopic pairs of MEMS gyroscopes 402 in a cuboid form 400. While illustrated as a cube, it will be appreciated that cuboid form 400 may be in other shapes as well, such as the arrangements illustrated with respect to FIGS. 5A-6B. As illustrated in FIG. 4A, the axes of rotation 404 are centered about the center of the cuboid form 400 and in FIG. 4B the opposing gyroscopic pairs of MEMS gyroscopes 402 are centered about the various primary axes of rotation 404 with the MEMS gyroscopes 402 of each opposing pair being oriented in opposite directions. For example, a MEMS gyroscope 402 on the left of the cuboid form 400 is oriented upward, while a right MEMS gyroscope 402 is oriented downward. With such arrangements, each opposing MEMS gyroscope 402 forming a respective opposing gyroscopic pair will experience the same forces (in opposite directions) and maximize the accuracy of the sensor measurements. Oftentimes, the MEMS gyroscopes 402 may be centered on a face or other surface of the cuboid form 400 relative to the primary axes 404 of rotation, which helps minimize the noise experienced by any of the opposing gyroscopic pairs. However, in some embodiments, some or all of the MEMS gyroscopes 402 may be offset from a center of a face or other surface of the cuboid form 400 and/or the primary axes 404 of rotation. The opposing pairs of MEMS gyroscopes 402 have a central axis extending between each of the MEMS gyroscopes 402 of the opposing pair that intersects an axis of rotation of the cuboid form 400 and/or other substrate on which the MEMS gyroscopes 402 are mounted. Additionally, while the MEMS gyroscopes 402 are arranged in a symmetrical manner in the illustrated embodiment, it will be appreciated that asymmetrical arrangements are possible.

A cuboid arrangement may also be achieved using a substrate in the form of a two-sided printed circuit board (PCB) 500 as illustrated in FIGS. 5A and 5B. A number of MEMS gyroscopes 502 may be arranged as opposing pairs on the PCB 500. For example, as shown in FIG. 5A, an opposing pair of MEMS gyroscopes 502 may be positioned such that one MEMS gyroscope 502 of the opposing pair is positioned on a top surface of the PCB 500 while the other MEMS gyroscope 502 is positioned on a bottom of the PCB 500. Here, the top MEMS gyroscope 502 is oriented to the right while the bottom MEMS gyroscope 502 is oriented to the left. As illustrated, an optional "spacer" 504 may be inserted between the main PCB 500 and the top and bottom MEMS gyroscopes 502 to maintain rotational symmetry, however it will be appreciated that in some embodiments the top and bottom MEMS gyroscopes 502 may both be mounted directly to the main PCB 500. The spacer 504 is not necessary, but can be advantageous where the central point of any physical rotation is also the intersection point of axis lines going through the opposing pairs. In some embodiments, one or more spacers may be positioned at other locations on the PCB 500. In some embodiments, the spacer 504 may itself be a PCB. Left and right MEMS gyroscopes 502 are positioned on a top surface of the PCB 500, although in some embodiments the left and right MEMS gyroscope 502 may be positioned on a bottom of the PCB 500. It will be appreciated that in some embodiments, both the top and the bottom of the PCB 500 may include MEMS gyroscopes 502 that are offset from the center of the PCB 500 (unlike the top and bottom MEMS gyroscopes 502). As illustrated in FIG. 5B, the PCB 500 further includes front and back MEMS gyroscopes 502 that are positioned on a top surface of the PCB 500.

In such an arrangement, the PCB 500 and MEMS gyroscope 502 effectively forms a squished cuboid form, having 3 dimensions in which the MEMS gyroscopes 502 may be mounted. It will be appreciated that the MEMS gyroscopes 502 may be positioned in any arrangement on the PCB 500. For example, the PCB 500 could just have a single opposing pair of MEMS gyroscopes 502. In other embodiments, the PCB 500 may have any number of opposing pairs. For example, rather than just having opposing pairs at 90 degree intervals, smaller or larger intervals may be used, such as 30 degrees, 45 degrees, 120 degrees, and/or any other angle. Moreover, while the left/right, front/back opposing pairs are equidistant from a center of the PCB 500, in some embodiments some or all of the opposing pairs may be at different distances relative to the center of the PCB 500. In some embodiments, some or all of the opposing pairs may be positioned such that a line connecting the MEMS gyroscopes 502 of a particular opposing pair is offset from the center of the PCB 500. In some embodiments, multiple MEMS gyroscopes 502 may be stacked vertically with one another to provide additional sensor depth in a vertical direction. The MEMS gyroscopes 502 may be spaced apart from one another and/or be touching one or more nearby MEMS gyroscopes 502.

In some embodiments the MEMS gyroscopes may be clustered such that an each face and/or each dimension (x, y, and z) of the CIMU/PCB includes multiple of the same MEMS gyroscope. An example of a PCB 600 (which may be similar to PCB 500) having 4 opposing pairs of MEMS gyroscopes 602 on a given dimension or face of the CIMU is illustrated in FIG. 6. The key to this arrangement is that the sensors are arranged in pairs such that the sensors are opposing and the mean or median is zero (assuming matched sensors). One possible way to ensure that the mean or median of opposing sensors is zero is to use the illustrated layout. However, it will be appreciated that there are numerous ways to arrange OGPs and the arrangement illustrated in this application are merely provided as examples.

Each CIMU may have its own processor that is configured to perform the processing functions described in conjunction with FIG. 2. In other embodiments, the CIMU may include a connector that allows a processor of another device to be connected to the MEMS gyroscopes such that the remote processor can perform the necessary processing. Such configurations allow the CIMU to share a processor with a device, such as a mobile phone, tablet computer, personal navigation device, and/or other mobile device without needed a dedicated processor to operate the CIMU. The processor and/or connector of the CIMU may be electronically coupled with the MEMS gyroscopes via a circuit. In addition, in some embodiments the CIMU may include and/or be coupled with one or more filters, such as Kalman filters, that may be used to help filter out and/or adjust the noise output of the individual MEMS gyroscopes and/or opposing pairs of MEMS gyroscopes. The CIMUs described herein may be utilized alone to determine rotational values and/or may be used in conjunction with other systems, such as GNSS systems and/or 3D dead reckoning algorithms to provide dead reckoning and/or other navigation capabilities.

Figure 7:
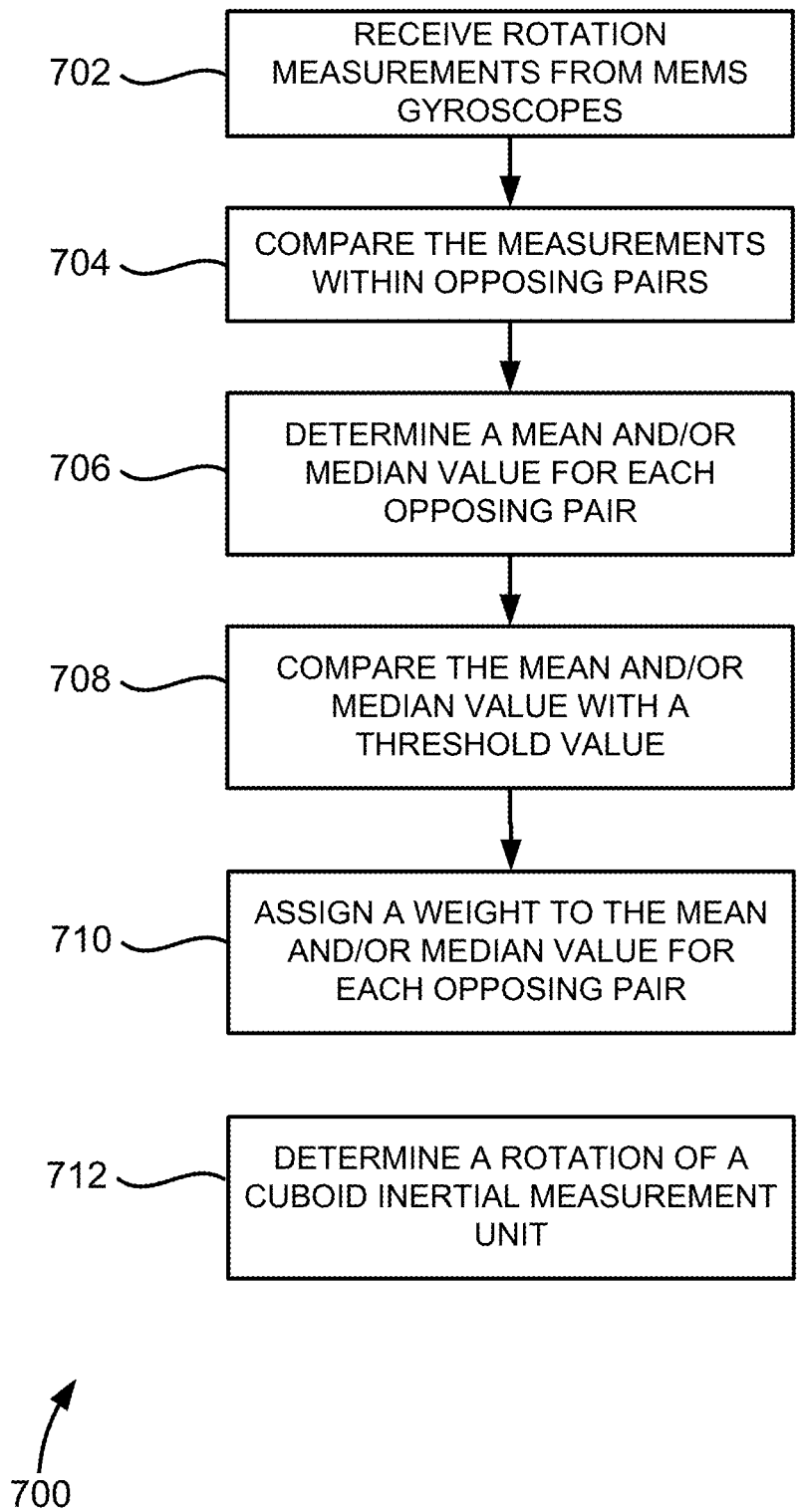
FIG. 7 is a flowchart illustrating a process for generating a rotational value according to embodiments.

FIG. 7 is a flowchart illustrating a process 700 for determining a rotation. Process 700 may be performed using any of the IMUs described herein and may begin at block 702 by receiving a rotational measurement from each of a plurality of MEMS gyroscopes positioned on a substrate of a cuboid inertial measurement unit. The MEMS gyroscopes are arranged on the substrate as opposing pairs with the MEMS gyroscopes of each of the opposing pairs of MEMS gyroscopes being oriented in opposite directions of one another. In some embodiments, each of the opposing pairs has a central axis that intersects at least one axis of rotation of the substrate. At block 704, the measurements from the MEMS gyroscopes of each of the opposing pairs are compared with one another. A mean and/or a median rotation value is determined for the measurements of each of the opposing pairs of MEMS gyroscopes at block 706. At block 708 the mean and/or median rotation value is compared with a threshold value and a weight is assigned to the mean and/or median value for each of the opposing pairs of MEMS gyroscopes at block 710. In some embodiments, the weight for each of the mean and/or median values for each of the opposing pairs of MEMS gyroscopes is based at least in part on a proximity of each of the at least one of the mean or the median value for each of the opposing pairs of MEMS gyroscopes to an expected value. For example, a first weight is assigned when a sum of the measurements of the MEMS gyroscopes from a single opposing pair is zero and a second weight is assigned when the sum of the measurements of the MEMS gyroscopes from a single opposing pair is non-zero, with the first weight being greater than the second weight. It will be appreciated that this is merely one example and that other weighting techniques are possible in accordance with the present invention.

At block 712 a rotation of the cuboid inertial measurement unit is determined based on the mean and/or median value for each of the opposing pairs of MEMS gyroscopes and the respective weight for each of the mean and/or median values for each of the opposing pairs of MEMS gyroscopes. In other words, a weighted average is generated based on weighted (and possibly corrected) mean and/or median values for the opposing pairs of MEMS gyroscopes. This weighted average may represent a rotational rate of the IMU and/or other object being measured. In some embodiments this output may be used in conjunction with other systems, such as GNSS systems and/or 3D dead reckoning algorithms to provide dead reckoning and/or other navigation capabilities.

In some embodiments, the process 700 may include applying a correction to at least one of the mean and/or the median rotation values prior to assigning the weight to the at least one of the mean and/or median rotation value. For example, if a particular mean and/or median value is deemed acceptable (within a threshold limit) but is not considered substantially or entirely accurate, a correction may be applied to the value and a weight reflecting a moderate level of confidence may be assigned to the value. In some embodiments, process 700 may also include removing at least one of the mean and/or median rotation values prior to assigning the weight to the at least one of the mean or the median rotation values. For example, if the value is beyond a threshold, it may be determined to be an outlier that is unreliable and rather than correcting the value it may be omitted from a calculation of the weighted average of all the opposing pair mean/median values that provides a rotational value. In some embodiments, the inertial measurement unit further includes a filter that is configured to eliminate a portion of noise detected by at least some of the opposing pairs.

Figure 8:
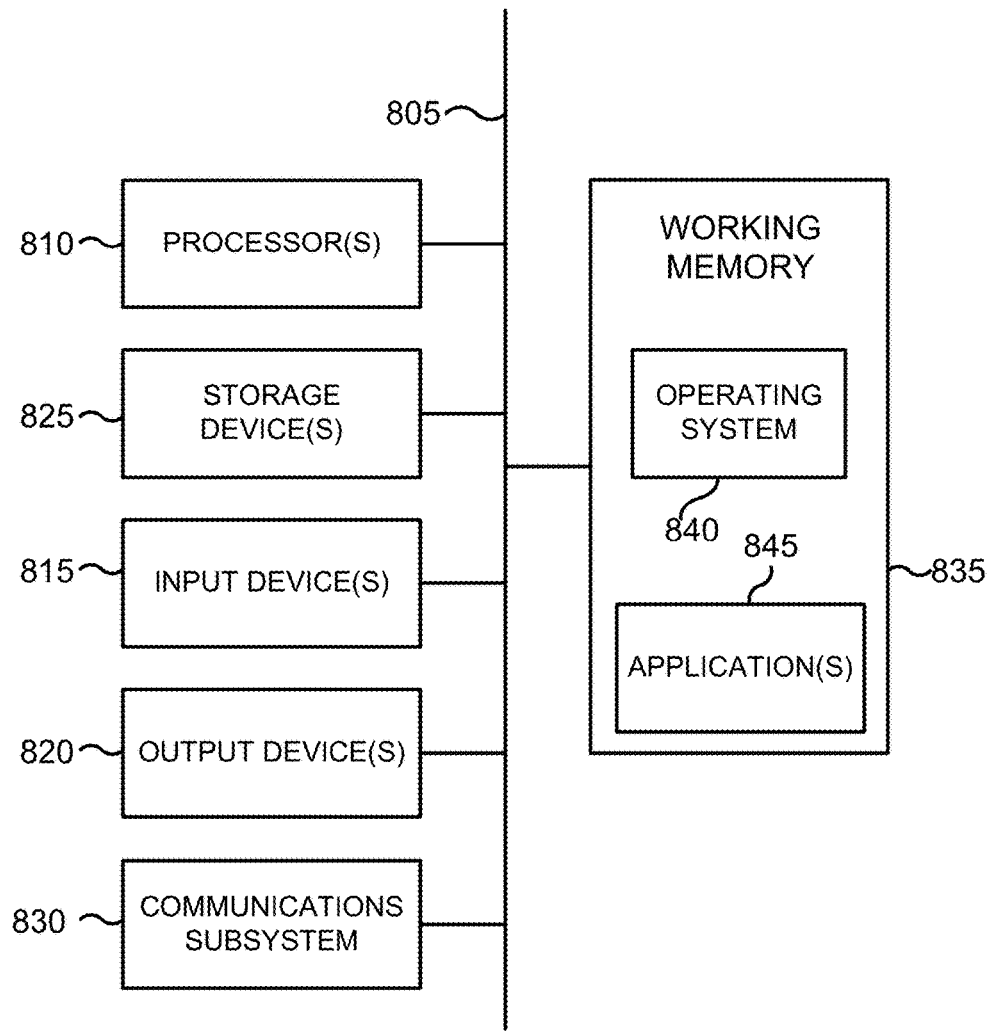
FIG. 8 is a block diagram of a computing system according to embodiments.

A computer system as illustrated in FIG. 8 may be incorporated as part of the previously described computerized devices. For example, computer system 800 can represent some of the components of the IMU processor, mobile devices, and the like described herein. FIG. 8 provides a schematic illustration of one embodiment of a computer system 800 that can perform the methods provided by various other embodiments, as described herein. FIG. 8 is meant only to provide a generalized illustration of various components, any or all of which may be utilized as appropriate. FIG. 8, therefore, broadly illustrates how individual system elements may be implemented in a relatively separated or relatively more integrated manner.

The computer system 800 is shown comprising hardware elements that can be electrically coupled via a bus 805 (or may otherwise be in communication, as appropriate). The hardware elements may include a processing unit 810, including without limitation one or more processors, such as one or more special-purpose processors (such as digital signal processing chips, graphics acceleration processors, and/or the like); one or more input devices 815, which can include without limitation a keyboard, a touchscreen, receiver, a motion sensor, a camera, a smartcard reader, a contactless media reader, and/or the like; and one or more output devices 820, which can include without limitation a display device, a speaker, a printer, a writing module, and/or the like.

The computer system 800 may further include (and/or be in communication with) one or more non-transitory storage devices 825, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 800 might also include a communication interface 830, which can include without limitation a modem, a network card (wireless or wired), an infrared communication device, a wireless communication device and/or chipset (such as a Bluetooth™ device, an 502.11 device, a Wi-Fi device, a WiMAX device, an NFC device, cellular communication facilities, etc.), and/or similar communication interfaces. The communication interface 830 may permit data to be exchanged with a network (such as the network described below, to name one example), other computer systems, and/or any other devices described herein. In many embodiments, the computer system 800 will further comprise a non-transitory working memory 835, which can include a RAM or ROM device, as described above.

The computer system 800 also can comprise software elements, shown as being currently located within the working memory 835, including an operating system 840, device drivers, executable libraries, and/or other code, such as one or more application programs 845, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such special/specific purpose code and/or instructions can be used to configure and/or adapt a computing device to a special purpose computer that is configured to perform one or more operations in accordance with the described methods.

A set of these instructions and/or code might be stored on a computer-readable storage medium, such as the storage device(s) 825 described above. In some cases, the storage medium might be incorporated within a computer system, such as computer system 800. In other embodiments, the storage medium might be separate from a computer system (e.g., a removable medium, such as a compact disc), and/or provided in an installation package, such that the storage medium can be used to program, configure and/or adapt a special purpose computer with the instructions/code stored thereon. These instructions might take the form of executable code, which is executable by the computer system 800 and/or might take the form of source and/or installable code, which, upon compilation and/or installation on the computer system 800 (e.g., using any of a variety of available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Moreover, hardware and/or software components that provide certain functionality can comprise a dedicated system (having specialized components) or may be part of a more generic system. For example, a risk management engine configured to provide some or all of the features described herein relating to the risk profiling and/or distribution can comprise hardware and/or software that is specialized (e.g., an application-specific integrated circuit (ASIC), a software method, etc.) or generic (e.g., processing unit 810, applications 845, etc.) Further, connection to other computing devices such as network input/output devices may be employed.

Some embodiments may employ a computer system (such as the computer system 800) to perform methods in accordance with the disclosure. For example, some or all of the procedures of the described methods may be performed by the computer system 800 in response to processing unit 810 executing one or more sequences of one or more instructions (which might be incorporated into the operating system 840 and/or other code, such as an application program 845) contained in the working memory 835. Such instructions may be read into the working memory 835 from another computer-readable medium, such as one or more of the storage device(s) 825. Merely by way of example, execution of the sequences of instructions contained in the working memory 835 might cause the processing unit 810 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 800, various computer-readable media might be involved in providing instructions/code to processing unit 810 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 825. Volatile media include, without limitation, dynamic memory, such as the working memory 835. Transmission media include, without limitation, coaxial cables, copper wire, and fiber optics, including the wires that comprise the bus 805, as well as the various components of the communication interface 830 (and/or the media by which the communication interface 830 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a magnetic medium, optical medium, or any other physical medium with patterns of holes, a RAM, a PROM, EPROM, a FLASH-EPROM, any other memory chip or cartridge, a carrier wave as described hereinafter, or any other medium from which a computer can read instructions and/or code.

The communication interface 830 (and/or components thereof) generally will receive the signals, and the bus 805 then might carry the signals (and/or the data, instructions, etc. carried by the signals) to the working memory 835, from which the processor(s) 805 retrieves and executes the instructions. The instructions received by the working memory 835 may optionally be stored on a non-transitory storage device 825 either before or after execution by the processing unit 810.

The methods, systems, and devices discussed above are examples. Some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

It should be noted that the systems and devices discussed above are intended merely to be examples. It must be stressed that various embodiments may omit, substitute, or add various procedures or components as appropriate. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known structures and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate to in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate to in the context of the systems, devices, circuits, methods, and other implementations described herein.

As used herein, including in the claims, "and" as used in a list of items prefaced by "at least one of" or "one or more of" indicates that any combination of the listed items may be used. For example, a list of "at least one of A, B, and C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, and C" may also include AA, AAB, AAA, BB, etc.

What is claimed is:

1. An inertial measurement unit, comprising:
   a substrate;
   a plurality of MEMS gyroscopes arranged on the substrate as opposing pairs, wherein the MEMS gyroscopes of each of the opposing pairs of MEMS gyroscopes are arranged on opposite sides of an axis of rotation of the substrate, and wherein the MEMS gyroscopes of each of the opposing pairs of MEMS gyroscopes are oriented in opposite directions of one another; and
   a processor that is configured to:
      receive a rotational measurement from each of the plurality of MEMS gyroscopes;
      compare the measurements from the MEMS gyroscopes of each of the opposing pairs with one another;
      determine at least one of a mean or a median rotation value for the measurements of each of the opposing pairs of MEMS gyroscopes;
      compare the at least one of the mean or the median rotation value with a threshold value;
      remove one or more of the at least one of the mean or the median rotation values based on the comparison;
      after removing the one or more of the at least one of the mean or median values, assign a weight to the at least one of the mean or the median value for each of the opposing pairs of MEMS gyroscopes; and
      determine a rotation of the inertial measurement unit based on the at least one of the mean or the median value for each of the opposing pairs of MEMS gyroscopes and the respective weight for each of the at least one of the mean or the median value for each of the opposing pairs of MEMS gyroscopes.

2. The inertial measurement unit of claim 1, wherein:
   the MEMS gyroscopes of each of the opposing pairs of MEMS gyroscopes are arranged symmetrically about the axis of rotation of the substrate.

3. The inertial measurement unit of claim 1, wherein:
   the plurality of MEMS gyroscopes comprises a first opposing pair that is arranged about a first axis of rotation of the substrate and a second opposing pair that is arranged about a second axis of rotation of the substrate, the first axis of rotation being transverse to the second axis of rotation.

4. The inertial measurement unit of claim 1, wherein:
   each of the opposing pairs has a central axis that intersects at least one axis of rotation of the substrate.

5. The inertial measurement unit of claim 1, further comprising:
   a filter that is configured to eliminate a portion of noise detected by at least some of the opposing pairs.

6. The inertial measurement unit of claim 5, wherein:
   the filter comprises a Kalman filter.

7. The inertial measurement unit of claim 1, wherein:
   at least some the plurality of MEMS gyroscopes are aligned with one another in three dimensions.

8. A method of determining a rotation, comprising:
   receiving a rotational measurement from each of a plurality of MEMS gyroscopes positioned on a substrate of a cuboid inertial measurement unit, wherein the plurality of MEMS gyroscopes are arranged on the substrate as opposing pairs, and wherein the MEMS gyroscopes of each of the opposing pairs of MEMS gyroscopes are oriented in opposite directions of one another;
   comparing the measurements from the MEMS gyroscopes of each of the opposing pairs with one another;
   determining at least one of a mean or a median rotation value for the measurements of each of the opposing pairs of MEMS gyroscopes;
   comparing the at least one of the mean or the median rotation value with a threshold value;
   removing one or more of the at least one of the mean or the median rotation values based on the comparison;
   after removing the one or more of the at least one of the mean or median values, assigning a weight to the at least one of the mean or the median value for each of the opposing pairs of MEMS gyroscopes; and
   determining a rotation of the cuboid inertial measurement unit based on the at least one of the mean or the median value for each of the opposing pairs of MEMS gyroscopes and the respective weight for each of the at least one of the mean or the median value for each of the opposing pairs of MEMS gyroscopes.

9. The method of determining a rotation of claim 8, further comprising:
   applying a correction to at least one of the mean or the median rotation values prior to assigning the weight to the at least one of the mean or the median rotation values.

10. The method of determining a rotation of claim 8, wherein:
    the weight for each of the at least one of the mean or the median value for each of the opposing pairs of MEMS gyroscopes is based at least in part on a proximity of each of the at least one of the mean or the median value for each of the opposing pairs of MEMS gyroscopes to an expected value.

11. The method of determining a rotation of claim 8, wherein:
a first weight is assigned when a sum of the measurements of the MEMS gyroscopes from a single opposing pair is zero;
a second weight is assigned when the sum of the measurements of the MEMS gyroscopes from a single opposing pair is non-zero; and
the first weight is greater than the second weight.

12. The method of determining a rotation of claim 8, wherein:
each of the opposing pairs has a central axis that intersects at least one axis of rotation of the substrate.

13. The method of determining a rotation of claim 8, wherein:
the inertial measurement unit further comprises a filter that is configured to eliminate a portion of noise detected by at least some of the opposing pairs.

14. An inertial measurement unit, comprising:
a substrate;
a plurality of MEMS gyroscopes arranged on the substrate as opposing pairs, wherein:
    the MEMS gyroscopes of each of the opposing pairs of MEMS gyroscopes are arranged on opposite sides of an axis of rotation of the substrate;
    the MEMS gyroscopes of each of the opposing pairs of MEMS gyroscopes are oriented in opposite directions of one another; and
    the plurality of MEMS gyroscopes are configured to measure a rotation of the substrate;
at least one electrical circuit in communication with the plurality of MEMS gyroscopes;
a processor; and
a connector that is in communication with the at least one electrical circuit and that is coupled with the processor so as to electronically couple the plurality of MEMS gyroscopes with the processor, wherein the processor is configured to:
    receive a rotational measurement from each of the plurality of MEMS gyroscopes;
    compare the measurements from the MEMS gyroscopes of each of the opposing pairs with one another;
    determine at least one of a mean or a median rotation value for the measurements of each of the opposing pairs of MEMS gyroscopes;
    compare the at least one of the mean or the median rotation value with a threshold value;
    remove one or more of the at least one of the mean or the median rotation values based on the comparison;
    after removing the one or more of the at least one of the mean or median values, assign a weight to the at least one of the mean or the median value for each of the opposing pairs of MEMS gyroscopes; and
    determine a rotation of the inertial measurement unit based on the at least one of the mean or the median value for each of the opposing pairs of MEMS gyroscopes and the respective weight for each of the at least one of the mean or the median value for each of the opposing pairs of MEMS gyroscopes.

15. The inertial measurement unit of claim 14, wherein:
the substrate comprises a printed circuit board.

16. The inertial measurement unit of claim 14, wherein:
the substrate comprises a top surface and a bottom surface; and
both MEMS gyroscopes of at least one opposing pair are positioned on the top surface or the bottom surface.

17. The inertial measurement unit of claim 14, wherein:
the substrate comprises a top surface and a bottom surface; and
a first MEMS gyroscope of at least one opposing pair is positioned on the top surface and a second MEMS gyroscope of the at least one opposing pair is positioned on the bottom surface.

18. The inertial measurement unit of claim 14, wherein:
each of the opposing pairs has a central axis that intersects at least one axis of rotation of the substrate.

19. The inertial measurement unit of claim 14, wherein:
at least some of the plurality of MEMS gyroscopes are arranged at approximately 45 degrees relative to one another.

* * * * *